July 9, 1957 W. ECKOLD 2,798,388
APPARATUS FOR DEFORMING, ESPECIALLY UPSETTING
OR STRETCHING, SHEETS OR PROFILES
Filed May 12, 1954
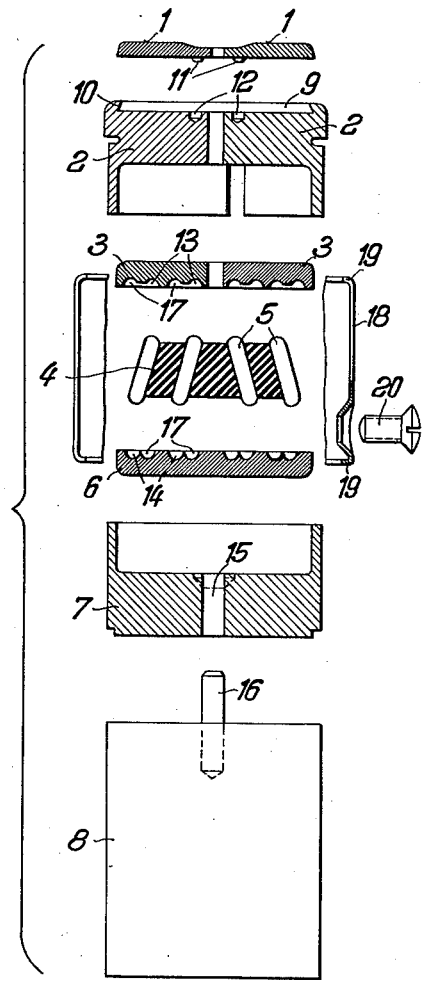
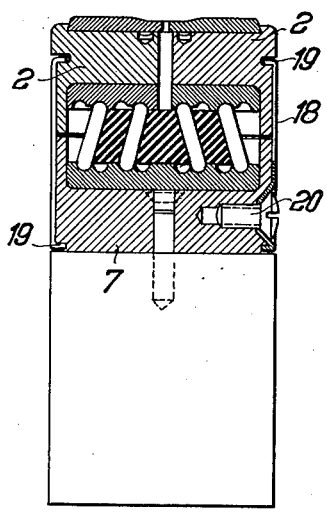
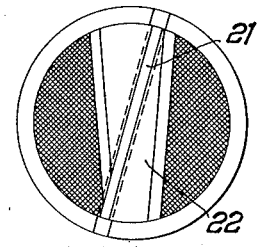
Inventor:
Walter Eckold
By: Young, Emery & Thompson
attys.

United States Patent Office
2,798,388
Patented July 9, 1957

2,798,388

APPARATUS FOR DEFORMING, ESPECIALLY UPSETTING OR STRETCHING, SHEETS OR PROFILES

Walter Eckold, St. Andreasberg, Sperrluttertal, Oberharz, Germany

Application May 12, 1954, Serial No. 452,195

Claims priority, application Switzerland May 18, 1953

6 Claims. (Cl. 78—61)

The invention relates to apparatus for deforming, especially upsetting or stretching, sheets or profiles, which comprises an upper part and a lower part, each part having one or more pairs of jaws arranged on a carrying body, there being interposed between the jaws and the carrying body support members which effect the mutal working movement of the jaws when a pressure is applied to the jaws in a direction perpendicular to that of the mutual movement of the jaws and which effect the return movement of the jaws when the pressure is removed.

These apparatus are, as a rule, brought into action upon the workpieces in a rapid working sequence, and are consequently subjected to very great wear, and hitherto were extremely liable to need repair. As a result it was necessary very often to interchange the complete apparatus, or to effect time-consuming and expensive repairs on them. These disadvantages are reduced or eliminated in apparatus constructed according to the invention.

According to the invention aparatus for deforming, especially upsetting or stretching, sheets or profiles, comprising an upper part and a lower part, each part having one or more pairs of jaws arranged on a carrying body, there being interposed between the jaws in the carrying body support members which effect the mutual working movement of the jaws when a pressure is applied to the jaws in a direction perpendicular to that of the working movement and which effect the return movement of the jaws when the pressure is removed, is characterised in that it is constructed for assembly in accordance with the principle of pre-fabrication from separate, easily interchangeable parts.

The wear which occurs during use of the apparatus affects the working surfaces of the jaws, in the first instance, since the jaws are usually externally grooved and this grooving wears off after only a relatively short working time. For this reason it is proposed, in accordance with the invention to equip the working surfaces of the jaws, with pressure plates, preferably hardened and provided with gripping outer surfaces, these plates being secured to the jaws in easily interchangeable fashion. These interchangeable pressure plates have the advantage that they can be stocked in sets, with stages or degrees of fineness of grip, in order that the apparatus may be easily adapted for use for any type of material of greater or less delicateness, by simply interchanging the pressure plates. Similarly, sets of pressure plates having recesses in the zone of deformation of various depths and widths can be stocked, in order that the clearance necessary for the required deformation can be adapted to the properties of the work-piece material in question.

The use of interchangeable pressure plates on the upper and lower parts of the apparatus also makes it possible to arrange that the line along which the plates in the upper part of the apparatus meet and that along which the plates in the lower part meet are skew.

The pressure plates are preferably inserted in flanges formed on the jaws, the inner edges of which are undercut and so inclined to the faces on which the pressure plates rest. In order to fix the pressure plates in position upon the jaws, one or more pins may be provided on them, which lie, when the plates are in position, in corresponding depressions in faces of the jaws.

In apparatus known hitherto, slots or grooves have been milled in the jaws and in the carrying body of the apparatus to facilitate the use of support members between the jaws and the carrying body. In hardening the parts in which the slots or grooves have been formed the parts have sometimes cracked, leading to the fracture of the parts. According to the present invention, it is proposed to provide special support plates in contact with the support members, and to interpose these plates, into which the necessary recesses have been formed between the support members and the jaws and the carrying body. Thus, the carrying body and the jaws need no longer be produced from expensive special-alloy tool steel, and the support plates can easily be interchanged when broken. It is also possible to adapt the crystalline structure of the plates to be the most suitable for withstanding the stresses occurring, the danger of fraction being thereby further reduced. The support members themselves can also be formed as a single part insertable and interchangeable as a unit, by vulcanisation into a rubber disc.

In order that the above-mentioned internal parts, namely the support plates and the rubber disc containing the support members disposed between them can be readily asembled with the jaws and the carrying body, the jaws and carrying body are provided with recesses into which the support plates can be fitted. The jaws and the carrying body may be held together, for example, by a sleeve embracing them laterally.

Such an apparatus, which can be assembled in accordance with the principles of pre-fabrication, presents the advantage that damaged parts can easily be replaced, so that provided that the necessary parts are kept in stock, interruptions of operation need be only small. The dismantling of the apparatus into its individual parts also makes it possible to use similar individual parts for different tools, and thus to approach standardisation. Since, for example, the support plates of the support members are provided with a second set of recesses, it is possible to use the same plates for stretching or upsetting. For this purpose it will usually be sufficient, simply to reverse the rubber disc disposed between them, the support members being inserted within the rubber disc at an inclination.

By way of example, an apparatus according to the invention will now be described with reference to the accompanying drawings in which:

Figure 1 is a longitudinal section through the separated assembly parts of the lower part of the apparatus, Figure 2 is a longitudinal section through the assembled lower part, Figure 3 shows a plan view of the lower part.

The lower part of the apparatus illustrated in Figure 1, which effects the deformation of the material clamped between it and a co-operating, similarly constructed, upper part, is made for assembly in prefabricated fashion, from a number of separate parts, namely the pressure plates 1, the recessed jaws 2, the upper support plates 3, the rubber disc 4 with the support members or leaves 5 inserted at an incline, the lower support plate 6 and the recessed carrying body 7, which is mounted upon a base 8. The pressure plates 1 may have roughened or grooved outer surfaces, and can be secured, for example, by means of countersunk screws, to the jaws 2. In a preferred embodiment the jaws 2 have undercut flanges 9 the undercut faces 10 being inclined to the bottom of the recess in the jaw, the edges of the pressure plates 1 being inclined laterally to mate with the latter. The lower side the pressure plates 1 have projections 11, corresponding depressions 12 being formed in the jaws 2, to facilitate fixing the plates in their correction positions.

The upper ends of the leaves 5 in the rubber disc 4 rests in a row of recesses 13 in the lower side of the upper support plate 3. The lower support plate 6, which has similar recesses 14, receives the lower ends of the leaves 5. The recessed carrying body 7 finally is mounted on the base 8 by means of its bore 15 and the pin 16 engaging therein.

In order to make it possible for the same apparatus to be used with the same individual parts for a stretching or upsetting operation, according to choice, the upper support plates 3 and the lower support plate 6 have, in addition to the above-mentioned recesses 13, 14, which correspond to the illustrated inclined position of the leaves 5 for an upsetting process, a second set of recesses 17, which render it possible to insert the rubber disc 4 with the leaves 5 in the reverse position, and thus to convert the apparatus from the condition shown in which it is used for upsetting material to the condition for stretching material clamped between the lower part, which is shown, and the upper part.

As appears more clearly from Figure 2, the individual parts mounted in and on one another are held together by a bi-partite sleeve 18, whose flanged edges 19 seat in grooves in the jaws 2 and the carrying body 7. The half sleeves are secured together by countersunk screws 20.

The plan view shown in Figure 3 is of an embodiment wherein the separating line 21 of the jaws of the lower part of the apparatus is skew to that of the line separating the jaws of the upper part of the apparatus. The separating lines of the jaws of the two parts of the apparatus intersect. Furthermore the average clearance 22 of each pair of jaws tapers, whereby a differential deformation of the material clamped between the upper and lower part of the apparatus can be achieved.

What I claim is:

1. An apparatus for deforming sheets and the like especially by upsetting and stretching, comprising recessed jaws arranged adjacent each other, pressure plates in a recess on one side of the jaws, upper support plates in a recess in the other side of the jaws, a recessed carrying body, a lower support plate in a recess in the carrying body, the upper support plates and the lower support plates each having a plurality of recesses therein, a plurality of supporting leaves mounted between and in the recesses in the support plates, said support leaves effecting a mutual working movement of the jaws when a pressure is applied to the jaws in a direction perpendicular to that of the working movement, and a plurality of rubber discs provided between the leaves.

2. An apparatus according to claim 1, in which a base with a pin is provided with the pin projecting into the recessed carrying body to support the latter.

3. An apparatus according to claim 1, in which a two-part sleeve is provided around and connected to the recessed jaw and the carrying body.

4. An apparatus according to claim 1, in which a two-part sleeve is provided around and connected to the recessed jaw and the carrying body, and in which means are provided to secure the sleeve to the recessed carrying body.

5. An apparatus for deforming metal sheets and the like especially by upsetting and stretching, comprising a recessed carrying body having a lower support plate provided in the recess, at least two recessed jaws mounted adjacent the carrying body and having at least two upper support plates in the recesses of the jaws, at least two pressure plates mounted on the recessed jaws, said upper support plates and the lower support plate each having a plurality of recesses therein, a plurality of supporting members mounted between the support plates in the recesses therein, and means to secure the recessed jaws to the carrying body, said supporting members effecting a mutual working movement of the jaws and their pressure plates when a pressure is applied to the jaws in a direction perpendicular to that of the working movement.

6. An apparatus according to claim 5, in which a base is provided for the carrying body with means to connect them to each other.

References Cited in the file of this patent

UNITED STATES PATENTS

| | | |
|---|---|---|
| 1,464,434 | Lungstrom | Aug. 7, 1923 |
| 1,809,168 | Junkers | June 9, 1931 |
| 2,010,996 | Junkers | Aug. 13, 1935 |
| 2,357,204 | Joyner | Aug. 29, 1944 |
| 2,364,938 | Beard | Dec. 12, 1944 |
| 2,407,573 | Nelson | Sept. 10, 1946 |
| 2,425,913 | Beard | Aug. 19, 1947 |
| 2,649,820 | Hunt | Aug. 25, 1953 |
| 2,699,079 | Eckold | Jan. 11, 1955 |